Dec. 27, 1932.  O. W. RODEMICH ET AL  1,892,078
AUTOMOBILE
Filed May 26, 1931    2 Sheets-Sheet 1
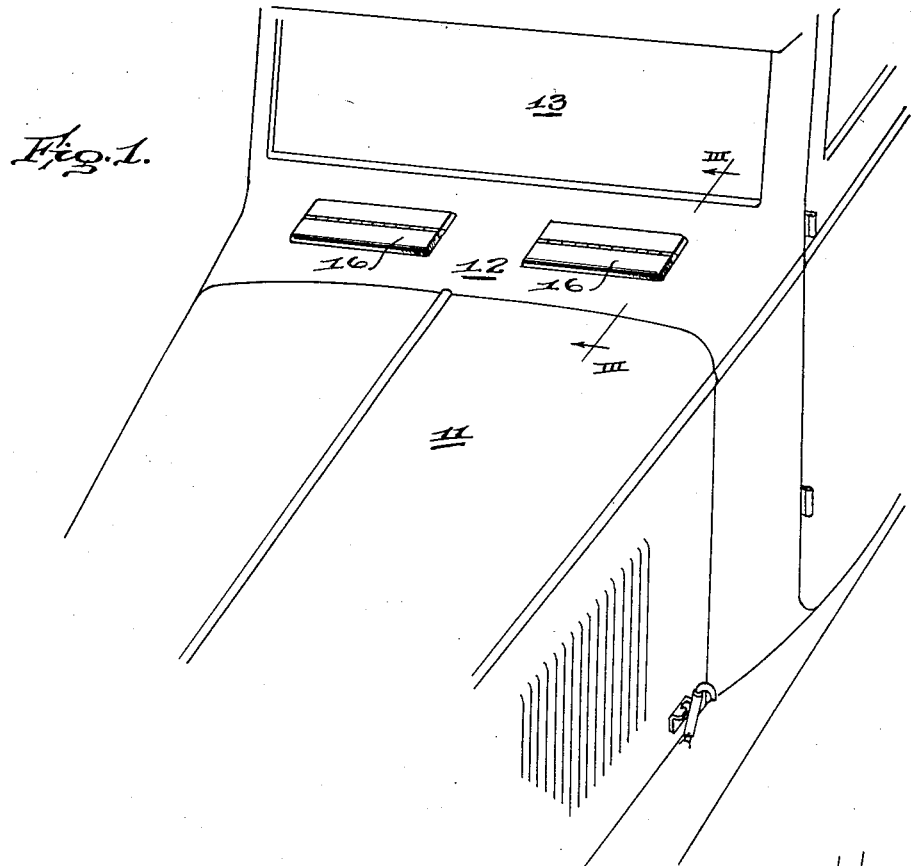
Fig.1.
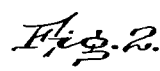
Fig.2.
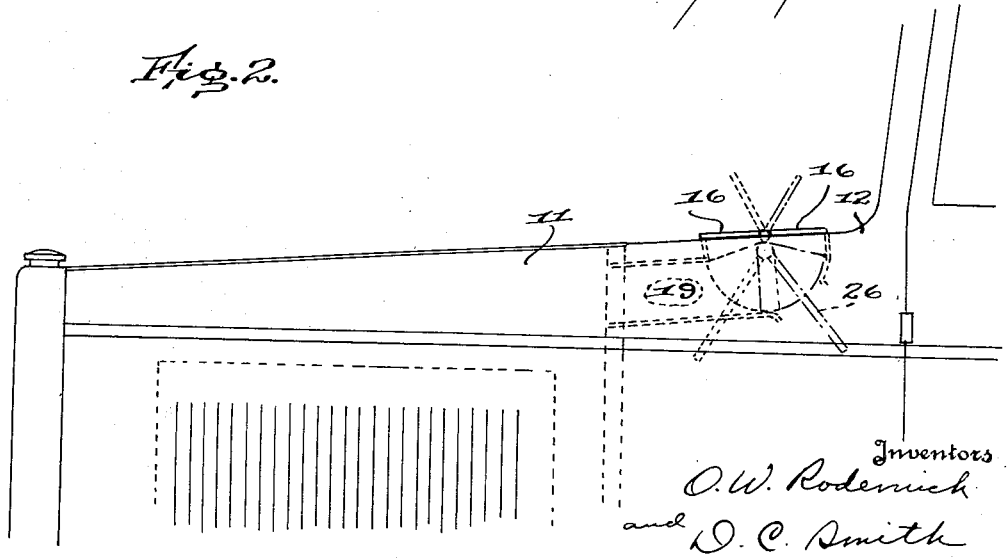
Inventors
O. W. Rodemich
and D. C. Smith
By J. Ralph Hoge
Attorney

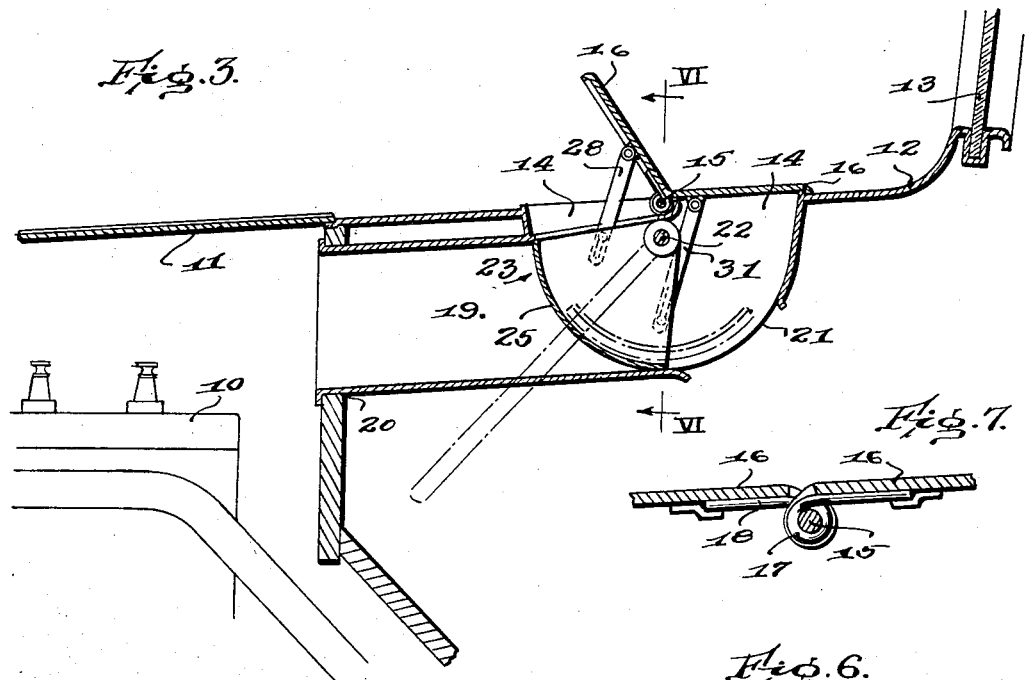
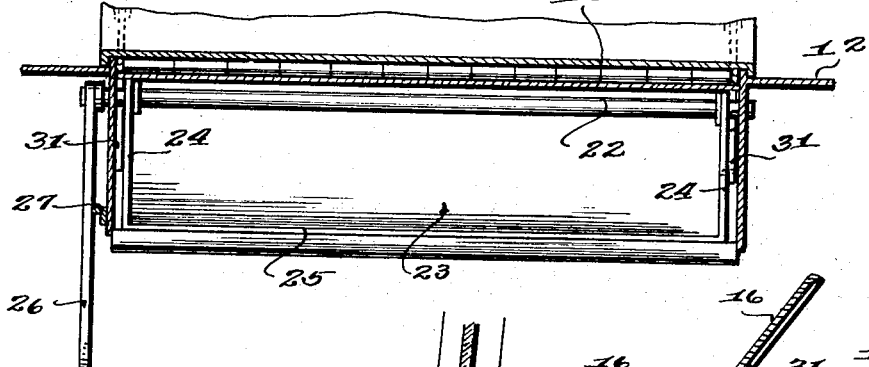
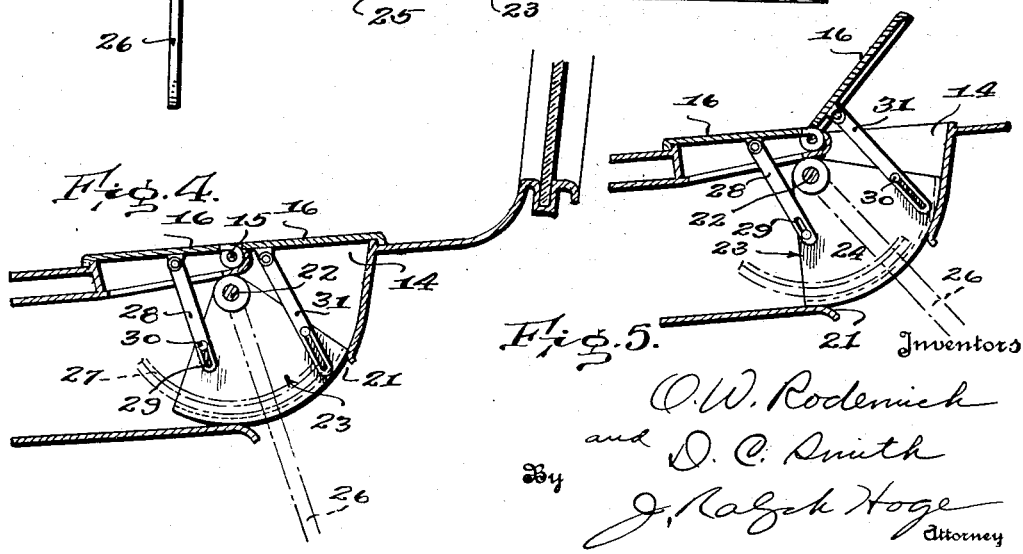

Patented Dec. 27, 1932

1,892,078

UNITED STATES PATENT OFFICE

OTTO W. RODEMICH AND DAVID C. SMITH, OF TOLEDO, OHIO, ASSIGNORS TO TOLEDO PATENTS, INC., A CORPORATION OF OHIO

AUTOMOBILE

Application filed May 26, 1931. Serial No. 540,074.

The present invention relates to improvements in automobiles and more particularly to cowl construction. In many recent models of automobiles, the cowls are provided with closable top openings the function of which is to admit outside air to the space below the cowl and thence to the interior of the automobile proper. Ordinarily these closures are operable from within the automobile and may be angularly adjusted to regulate the amount of air passing through the openings.

In a pending application of ours, Serial Number 528,760, filed April 9, 1931, we have disclosed an improved cowl construction whereby warm or hot air beneath the engine hood may be applied to the forward surface of the windshield to remove or/and prevent condensation thereon.

An object of the present invention is the provision of novel means whereby both of the above features may be combined in a single unit and operated by a single control device. To this end there is provided a pair of openings in the upper side of the cowl and means whereby both may be closed simultaneously or opened one at a time in a fashion to permit flow of cool outside air into the space beneath the cowl and thence to the automobile proper, or to cause application of warm or hot air to the forward surface of the windshield.

Another object is the provision in an apparatus of the above character of a novel valve arrangement, the position of which determines the positions of cover plates for the cowl openings.

Other objects will be in part apparent and in part pointed out hereinafter.

In the drawings:

Fig. 1 is a fragmentary perspective view of an automobile illustrating one adaptation of our invention thereto.

Fig. 2 is a fragmentary side elevation thereof.

Fig. 3 is a sectional view taken substantially along the line III—III of Fig. 1, showing one of the closures adjusted to admit outside air beneath the cowl.

Fig. 4 is a sectional view showing the inoperative position of the apparatus.

Fig. 5 is a view similar to Fig. 4 showing the parts in position to cause application of warm air to the windshield.

Fig. 6 is a sectional view taken along the line VI—VI of Fig. 3.

Fig. 7 is a detail sectional view showing the common hinge pin for both closure plates and the spring for normally holding them closed.

The illustrated embodiment of our invention is shown in conjunction with an automobile of usual form including an engine 10, a hood 11, a cowl 12, and a windshield 13, all being relatively positioned in the customary fashion.

As briefly stated heretofore the present invention provides a compact and readily adjustable means for supplying outside air to the space beneath the cowl 12 and thence to the interior of the automobile proper, or directing warm or hot air against the forward surface of the windshield for the purpose of removing or preventing condensation thereon. The construction involved may be as follows: At each side (or if preferred, at the center only) of the longitudinal center of the cowl there is provided a pair of vertical openings 14 each of rectangular configuration. These openings are of greater length than width and are disposed adjacent the windshield 13 and parallel thereto. A hinge pin 15 extends lengthwise of and between the openings and to this single hinge pin is pivoted a pair of closure or cover plates 16 individual to said openings. A coil spring 17 encircles the hinge pin and has arms 18 attached to the plates 16. This spring yieldingly holds the plates 16 closed as in Fig. 4.

A conduit 19 for warm or hot air is arranged beneath and lengthwise of the cowl. One end of the conduit is open and seated in a dash opening 20 while its other end communicates directly with both of the cowl openings 14. The lower wall of the conduit in proximity to the openings 14 is provided with a bottom outlet 21 through which outside air may enter the space beneath the cowl. A portion of the wall in proximity to the bottom outlet 21 is curved about the axis of a rock shaft 22 upon which a valve 23 is mounted for oscillation. This rock shaft is disposed directly below and parallel with the hinge pin 15. The valve comprises a pair of substantially triangular end walls 24 or arms disposed at right angles to and connecting an elongated plate 25 which is curved transversely about the axis of said shaft 22. The end walls have one margin similarly curved. The width of the plate 25 is sufficient to shut off the main portion of the conduit from communication with the cowl openings or to close the bottom outlet 21 at the will of the operator. A hand lever 26 or other device secured to one end of the rock shaft 22 may be utilized to oscillate the valve 23. The lever may be releasably held in any adjusted position by frictional engagement with a retaining device 27 on one end wall of the conduit. The device 27 may well be a toothed or notched bar functioning in an entirely obvious manner.

It is intended that when the cover plate adjacent the windshield is entirely open, the valve 23 shall be in position to close the bottom outlet 21 in the conduit, allowing warm air to impinge against the windshield 13. Lowering of this closure plate 16 and raising of the forward one moves the valve 23 to a position across the conduit and opens the bottom outlet 21 so that outside air flows into the space below the cowl 12. The construction for accomplishing the above operations involves linking the valve 23 and closure plates together. A pair of links 28 are pivoted at their upper ends to the opposite ends of the forward closure plate and at their lower ends are formed with slots 29 through which pivot pins 30 on the valve 23 extend. Similarly formed links 31 connect the rear closure plates to the valve 23. The pivot pins 30 are spaced apart on the end walls 24 of the valve 23 and so positioned relative to each other and the slots 29 that with movement of said valve 23 the closure plates may assume any of the three positions illustrated. It will be noted that in moving the valve 23 from one position to another it may, due to the pin and slot devices, move a predetermined distance before imparting any movement whatever to the closure plate and that only by additional swinging movement of said valve will either closure plate be opened. Thus both closure plates may be completely closed (Fig. 4) or either one opened independently of the other. When the rear closure plate is opened (Fig. 5) sufficiently it serves to direct the exhausted warm air to the windshield. Opening of the front closure plate (Fig. 3) will, of course, direct a stream of outside air into the space below the cowl and thence into the cab of the automobile.

Modifications may be resorted to within the spirit and scope of the appended claims.

What we claim is:

1. In an automobile the combination of a windshield, a cowl, a source of supply of warm air, said cowl having a pair of vertical openings extending transversely in its upper side, closures individual to the openings, means for opening and closing the closures one at a time, and means forming part of said opening and closing means whereby opening one of said closures automatically places the corresponding opening in direct communication with the source of supply of warm air, and closes the other opening.

2. In an automobile the combination of a windshield, a cowl, a source of supply of warm air, said cowl having a pair of vertical openings extending transversely in its upper side, closures individual to the openings, means for opening and closing the closures one at a time, and means forming part of the opening and closing means whereby opening one of said closures automatically places the corresponding opening in direct communication with the source of supply of warm air and opening of the other closure establishes communication between the upper and lower sides of the cowl and shuts off communication between the other opening and said source of supply of warm air.

3. In an automobile, the combination of an engine, a dash, a cowl, a windshield, said cowl having a pair of vertical openings in its upper side adjacent the windshield, said dash having a horizontal opening therein, a conduit connecting all of said openings and having a downwardly facing outlet in proximity to the pair of openings, separate closures for said pair of openings, a valve within the conduit, connectors linking the valve and closures together, and means for moving the valve to one position in which it lifts one of the closures, opens the bottom outlet, and breaks communication between the dash opening and other openings, and to another position in which it lowers said one closure, opens the other closure, and establishes communication between the dash opening and the other cowl opening and closes said bottom outlet.

4. In an automobile, the combination of an engine, a dash, a cowl, a windshield, said cowl having a pair of vertical openings in its upper side adjacent the windshield, said dash having a horizontal opening therein, a conduit connecting all of said openings and having a downwardly facing outlet in proximity to the pair of openings, separate closures for said pair of openings, a valve within the conduit, connectors linking the valve and closures together, means for moving the valve to one position in which it lifts one of the closures, opens the bottom outlet, and breaks communication between the dash opening and other openings, and to another position in which it lowers said one closure, opens the other closure and establishes communication between the dash opening and the other cowl opening, and closes said bottom outlet, said valve moving means including a lever attached to the valve, and means for releasably holding the lever in various operating positions.

5. In an automobile the combination of a cowl, a windshield, said cowl having a pair of vertical openings in its upper side adjacent the windshield, a conduit arranged beneath the cowl and having one end communicating with said openings, means for introducing warm air into the other end of the conduit, said conduit having a bottom outlet below the pair of openings, a pivoted closure for each opening, a valve arranged within the conduit and movable to various positions, said valve in one position shutting off communication between said other end of the conduit and the pair of openings and establishing communication between the openings and said bottom outlet, and in another position effecting communication between said one end of the conduit and the openings and closing said bottom outlet means for moving the valve and means whereby operation of the valve actuates the closures causing them to open one at a time.

6. In an automobile the combination of a windshield, a cowl, a source of supply of warm air, said cowl having a pair of vertical openings extending transversely in its upper side, a hinged cover plate for each opening, a conduit communicating at one end with said openings, means for introducing warm air into the other end of said conduit, said conduit having a bottom outlet directly below the openings, a valve mounted for oscillation in the conduit, said valve in one position closing the bottom outlet and in another position shutting off communication between the openings and said other end of the conduit, means for moving the valve, and links connecting the valve and cover plates whereby oscillation of the valve opens the cover plates one at a time.

7. In an automobile the combination of a windshield, a cowl, a source of supply of warm air, said cowl having a pair of vertical openings extending transversely in its upper side, a hinged cover plate for each opening, a conduit communicating at one end with said openings, means for introducing warm air into the other end of said conduit, said conduit having a bottom outlet directly below the openings, a valve mounted for oscillation in the conduit, said valve in one position closing the bottom outlet and in another position shutting off communication between the openings and said other end of the conduit, means for moving the valve, pairs of links pivoted to the cover plates, and pin and slot connection between the links and said valve, said links transmitting movement from the valve to the cover plates whereby the latter are opened one at a time.

8. In an automobile the combination of a cowl, a windshield, said cowl having a pair of vertical openings in its upper side adjacent the windshield, a conduit arranged beneath the cowl and having one end communicating with said openings, means for introducing warm air into the other end of the conduit, said conduit having a bottom outlet below the pair of openings, a hinge pin disposed between the openings, cover plates individual to the openings pivoted to said hinge pin, spring devices yieldingly holding the cover plates in position to close the openings, a movable valve in the conduit, means operatively connecting the valve and closures, and means whereby the valve may be positioned to close the bottom outlet and lift one closure and establish communication between said one end of the conduit and one of the openings or positioned to break said communication and open the bottom outlet and the other opening whereby outside air may flow through said other opening and outlet to the space below the cowl.

9. In an automobile the combination of a windshield, a cowl, a source of supply of warm air, said cowl having a pair of vertical openings extending transversely in its upper side, a conduit beneath the cowl connecting the source of supply of warm air and said openings, said conduit having a bottom opening, closures individual to the cowl openings, a valve in said conduit movable between two positions simultaneously with opening and closing of said closures, said valve in one position establishing communication between the source of supply of warm air and one opening and in the other position establishing communication between the upper and lower sides of the cowl by way of the other opening and the bottom opening, and means whereby movement of the valve a predetermined degree actuates said closures.

10. In an automobile, the combination of a windshield, a cowl, a source of supply of warm air, said cowl having a pair of vertical openings extending transversely in its upper side, pivoted closures individual to said openings, a conduit leading from the warm air supply to the openings and having an outlet below and adjacent said openings, a valve arranged in and near one end of the conduit and movable to alternately close the outlet and shut off communication between the openings and other end of the conduit, and links connecting the closures and valve whereby movement of the valve opens the closures one at a time.

11. In an automobile, a cowl, a windshield, an engine, a dash at the front end of the cowl, said cowl having a pair of vertical openings therein adjacent the windshield, closures individual to said openings, means including a conduit and dash opening below the cowl for delivering heated air to the openings, said conduit closing the lower sides of the cowl openings and having an outlet adjacent said openings leading to the space below the cowl, a valve within the conduit movable to establish communication between the dash opening and cowl openings or between said outlet and cowl openings, means for actuating the valve, and connectors between the valve and closures whereby the closures may be opened one at a time by a predetermined degree of movement of said valve.

12. In an automobile, a cowl, a windshield, said cowl having a pair of parallel vertical openings adjacent and parallel with the windshield, means including a source of supply of heated air for directing air to the lower side of said openings, means for closing the openings, means for opening the cowl openings one at a time, and means for shutting off the supply of heated air to the cowl openings when the forward opening is opened and affecting communication between said forward opening and the space below the cowl.

13. In an automobile, a cowl, a windshield, said cowl having a pair of parallel vertical openings adjacent and parallel with the windshield, means including a source of supply of heated air for directing air to the lower side of said openings, means for closing the openings, means for opening the cowl openings one at a time, and means for shutting off the supply of heated air to the cowl openings when the forward opening is opened and effecting communication between said forward opening and the space below the cowl, said means for shutting off the heated air operating automatically to open the cowl openings one at a time.

14. In an automobile, a cowl, a windshield, said cowl having a pair of parallel vertical openings adjacent the windshield, closures individual to the openings, means for opening the closures one at a time, a source of supply of heated air, and means whereby opening of one closure establishes communication between the corresponding opening and the source of supply of heated air and opening of the other closure establishes communication between the other opening and the space below the cowl.

Signed at Toledo, in the county of Lucas and State of Ohio, this 25th day of May, 1931.

OTTO W. RODEMICH.
DAVID C. SMITH.